United States Patent [19]
Higurashi

[11] Patent Number: 5,986,833
[45] Date of Patent: Nov. 16, 1999

[54] DATA RECORDING METHOD FOR RECORDING ABSOLUTE ADDRESS DATA ON A TAPE STORAGE MEDIUM

[75] Inventor: Seiji Higurashi, Fuchu, Japan

[73] Assignee: Victor Company of Japan, Ltd., Yokohama, Japan

[21] Appl. No.: 08/759,973

[22] Filed: Dec. 3, 1996

[30] Foreign Application Priority Data

Dec. 4, 1995 [JP] Japan ................................. 7-315697

[51] Int. Cl.$^6$ .............................. G11B 5/09; G11B 15/18
[52] U.S. Cl. ........................................... 360/49; 360/72.2
[58] Field of Search .............................. 360/72.2, 48, 49; 386/95

[56] References Cited

U.S. PATENT DOCUMENTS

| | | | |
|---|---|---|---|
| 5,148,331 | 9/1992 | Kashida et al. ....................... | 360/77.15 |
| 5,541,737 | 7/1996 | Oguro et al. ........................... | 360/48 X |
| 5,719,721 | 2/1998 | Lizuka et al. .......................... | 360/72.2 |

FOREIGN PATENT DOCUMENTS

| | | |
|---|---|---|
| 0 551 944 | 7/1993 | European Pat. Off. . |
| 0 603 808 | 6/1994 | European Pat. Off. . |
| 0 723 267 A2 | 7/1996 | European Pat. Off. . |
| 0 723 267 A3 | 7/1996 | European Pat. Off. . |

*Primary Examiner*—Aristotelis M. Psitos
*Assistant Examiner*—Regina Y. Neal
*Attorney, Agent, or Firm*—Michael N. Meller

[57] ABSTRACT

Data is recorded over tracks formed on a tape storage medium at a predetermined track pitch selected from a plurality of track pitches. The selected predetermined track pitch is larger than the minimum track pitch among the plurality of track pitches. First absolute addresses of tracks formed by the minimum track pitch are decided. Second absolute addresses of tracks formed by the predetermined track pitch are decided using the first absolute addresses. The data and the second absolute addresses are recorded over the tracks formed by the predetermined track pitch. In decision of the second absolute values, a value of (n−m) high order bits of n bits of each of the second absolute addresses is increased per track formed by the predetermined track pitch, where n is a natural number of two or more and m is another natural number of one or more but smaller than n. The first absolute addresses are also expressed by the n and m bits. Values of the m low order bits of the first absolute addresses are set as values of the m low order bits of the second absolute addresses.

5 Claims, 4 Drawing Sheets

| SB# | ID0 | | | | | | | | ID1 | | | | | | | |
|---|---|---|---|---|---|---|---|---|---|---|---|---|---|---|---|---|
| | BIT7 | BIT6 | BIT5 | BIT4 | BIT3 | BIT2 | BIT1 | BIT0 | BIT7 | BIT6 | BIT5 | BIT4 | BIT3 | BIT2 | BIT1 | BIT0 |
| 4n | RESERVED | | | | | | | | Tag | | | | SYNC BLOC NO. | | | |
| 4n+1 | SF | TRACK NO.(UPPER BYTE) | | | | | | | Tag | | | | SYNC BLOC NO. | | | |
| 4n+2 | TRACK NO.(MIDDLE BYTE) | | | | | | | | Tag | | | | SYNC BLOC NO. | | | |
| 4n+3 | TRACK NO.(LOWER BYTE) | | | | | | | | Tag | | | | SYNC BLOC NO. | | | |

FIG.7

DATA RECORDING METHOD FOR RECORDING ABSOLUTE ADDRESS DATA ON A TAPE STORAGE MEDIUM

BACKGROUND OF THE INVENTION

The present invention relates to a data recording method. More specifically, this invention relates to a data recording method for recording absolute addresses with data on a tape storage medium.

Conventionally, a helical scanning type magnetic recording and/or reproducing apparatus, that is, a video tape recorder (VTR) has been well known. Data such as audio and/or video signals are recorded on or reproduced from a tape storage medium (e.g., magnetic tape) by the apparatus in the form of analog or digital signals. In recording, tracks are formed on the tape storage medium by use of a single or plural rotary heads such that the tracks are inclined with respect to the tape longitudinal direction.

In the conventional apparatus, absolute tape addresses are recorded on the inclined tracks or tracks extending in the tape longitudinal direction for tape localization in automatic data search or automatic electronic edition. As the absolute addresses, there are time codes for determining tape addresses in 24-hour frame system, that is, in unit of time, minute and second for each TV frame, or track numbers indicative of the sequence of the inclined tracks.

There is also known a signal recording apparatus such as a digital audio tape recorder (DAT) for recording digital (main) data (e.g., audio and/or video signals) and other sub-data to be reproduced by use of rotary heads. The sub-data includes track numbers recorded as absolute addresses with the digital data by sequentially synthesizing them per data block.

In the conventional apparatus, the track numbers are increased during recording whenever the tracks are recorded at a first track pitch. Thus, in recording new data by sequentially forming inclined tracks at a second track pitch different from the first pitch midway of the magnetic tape, for instance, it is impossible to utilize the preceding track numbers recorded at the first track pitch.

Further, in recording absolute addresses midway of the recording process, although the tape position can be assumed to some extent on the basis of the known method of calculating the remaining tape rates, it is impossible to eliminate the calculation error.

SUMMARY OF THE INVENTION

With these problems in mind, therefore, it is an object of the present invention to provide a data recording method, by which absolute address data is recorded on a storage medium so that tape localization can be conducted accurately, even when tracks are recorded at various pitches.

To achieve the above-mentioned object, the present invention provides a method of recording data over tracks formed on a tape storage medium at a predetermined track pitch selected from a plurality of track pitches, the selected predetermined track pitch being larger than the minimum track pitch among the plurality of track pitches, the method comprising the steps of: deciding first absolute addresses of tracks formed by the minimum track pitch; deciding second absolute addresses of tracks formed by the predetermined track pitch using the first absolute addresses; and recording the data and the second absolute addresses over the tracks formed by the predetermined track pitch.

The second absolute address deciding step may comprise the steps of: increasing a value of (n−m) high order bits of n bits of each of the second absolute addresses, per track formed by the predetermined track pitch, where n is a natural number of two or more and m is another natural number of one or more but smaller than n, the first absolute addresses being expressed by the n and m bits; and setting first values of the m low order bits of the first absolute addresses as second values of the m low order bits of the second absolute addresses.

The setting step may comprise the step of deciding the first values set as the second values using a ratio of the minimum track pitch to the predetermined pitch.

BRIEF DESCRIPTION OF THE DRAWINGS

FIG. 7 is an illustration showing contents of ID0 and ID1 shown in FIG. 6.

DETAILED DESCRIPTION OF THE PREFERRED EMBODIMENTS

An embodiment of the data recording method according to the present invention will be described in detail hereinbelow with reference to the attached drawings.

Figure 1:
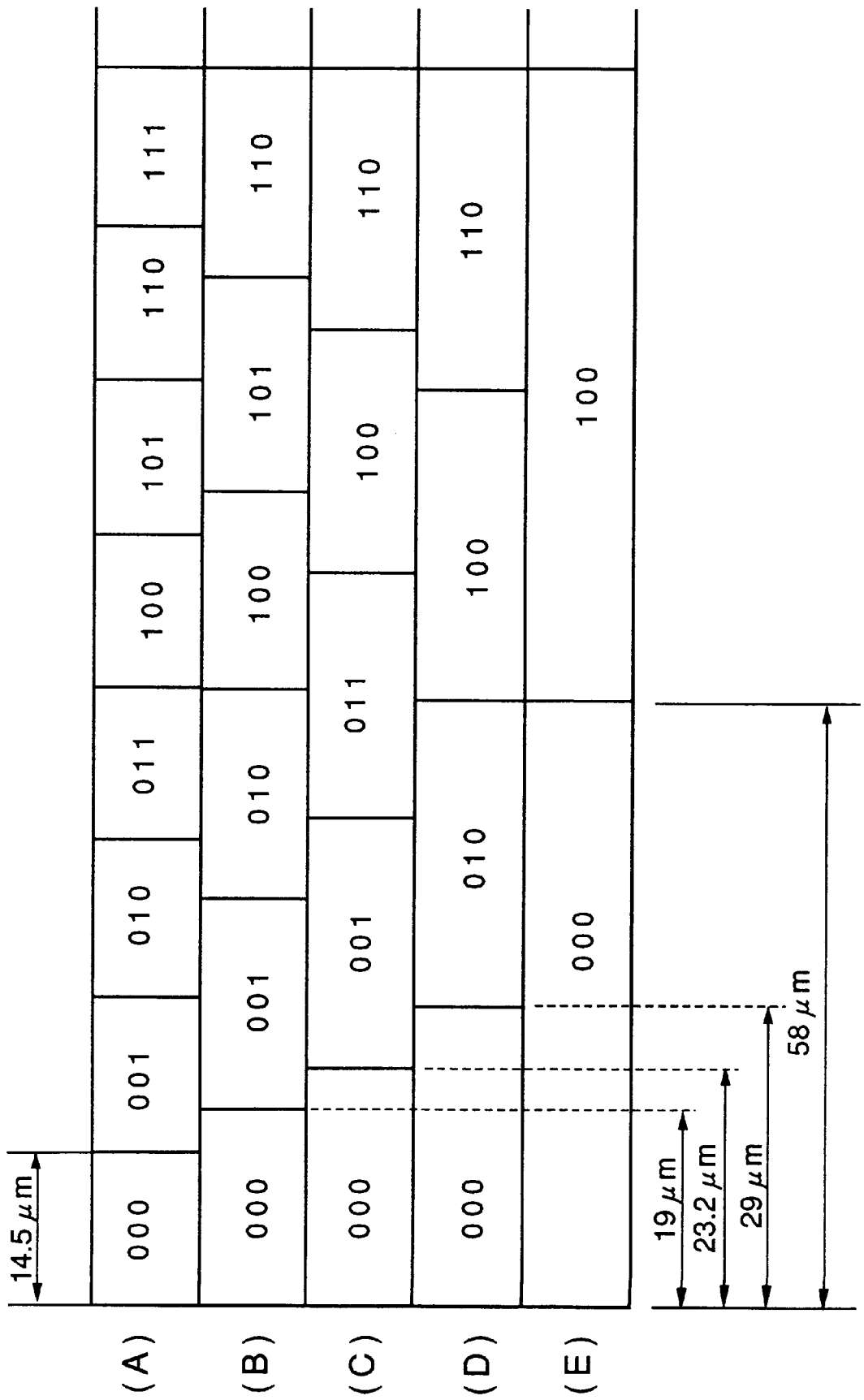
FIG. 1 is an illustration for assistance in explaining the change of three lower order bits of the track numbers recorded in accordance with an embodiment of the data recording method according to the present invention.

In the data recording method according to the present invention, track numbers and support flags (SF) for discriminating the track numbers from each other are both recorded at a desired track pitch selected from a plurality of track pitches, as shown in FIG. 1, together with digital signals. FIG. 1 is an illustration for assistance in explaining the change of three lower order bits of the track numbers recorded according to various track pitches and in accordance with the method according to the present invention. This will be described in detail later.

The digital signals, track numbers, and support flags are recorded and reproduced by a helical scanning type magnetic recording and reproducing apparatus (VTR) on and from a magnetic tape with two rotary heads. The rotary heads are arranged so as to be opposed to each other (i.e., arranged 180 degree angular distance away from each other) and having two different azimuth angles. The magnetic tape is wound obliquely around an outer circumferential surface of a rotary body installed in the apparatus over about 180 degree angular range. The magnetic tape is then moved at a constant travel speed so that the digital signals, track numbers, and support flags are recorded and reproduced on and from the magnetic tape by use of the two rotary heads.

Here, each track recorded on a magnetic tape are constructed by arranging a plurality of data areas of constant bits under the scanning operation of the rotary heads. Each data area corresponds to a data block and referred to as a synchronous (sync) block.

Figure 2:
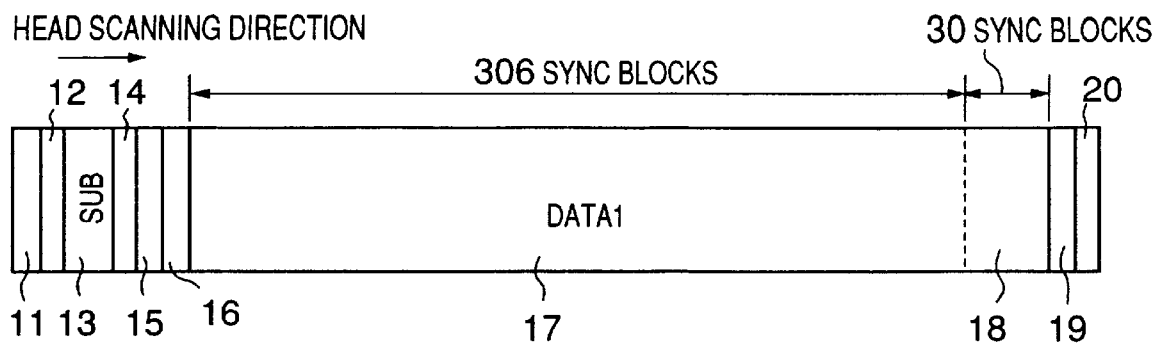
FIG. 2 is an illustration showing an example of track format applied to the method according to the present invention.

FIG. 2 shows a track format in which digital signals obtained by synthesizing a plurality of data blocks referred to as sync blocks are sequentially recorded per track.

In more detail, the track format shown in FIG. 2 is composed of a margin area 11, a preamble area 12, a subcode area 13, a post-amble area 14, an IBG area 15, a preamble area 16, a data area 17, an error correction code area 18, a post-preamble area 19, and a margin area 20. Here, the data area 17 and the error correction code area 18 construct the major data area. And, digital signals DATA1 of 306 sync blocks as normal reproduction data or special reproduction data are recorded on the data area 17. Further, external codes (C3 codes) of 30 sync blocks for error correction are recorded on the error correction code area 18.

Figure 3:
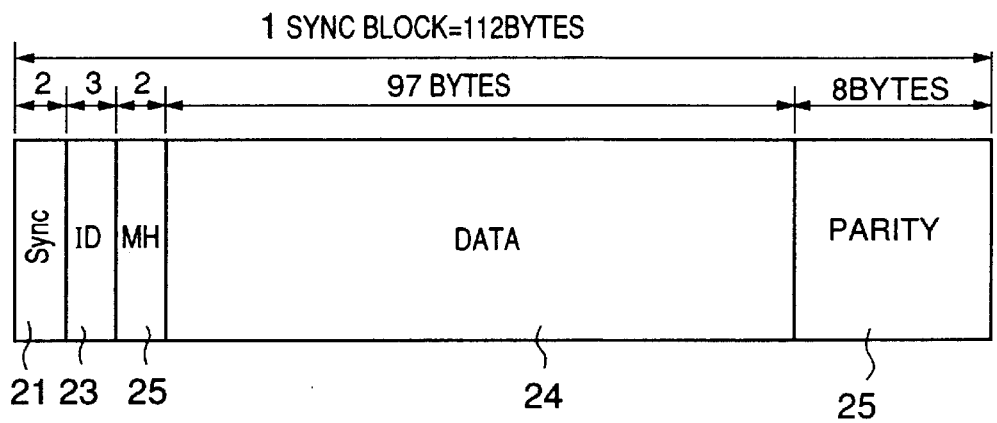
FIG. 3 is an illustration showing an example of the format of the main data area of the track format shown in FIG. 2.

The sync block will be explained in further detail. FIG. 3 shows an example of the sync block format for the main data area 17 in which the main data are recorded. And, FIG. 4 shows an example of the block format for the subcode area 13 in which the subcode are recorded.

As shown in FIG. 3, the sync block (i.e., data block) of the main data area 17 is composed of a two-byte synchronizing signal (sync) area 21 for reproducing the sync block, a three-byte address data (ID) area 22, a two-byte main header (MH) area 23 for recording format data, a 97-byte data storage area 24 for storing various data, and an eight-byte parity area 25 for correcting error of this sync block, which are all sequentially synthesized as 112 bytes in total.

Figure 4:
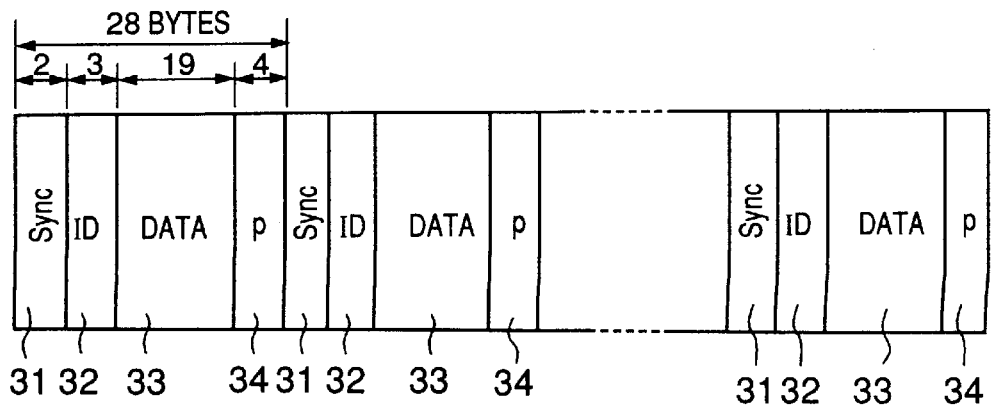
FIG. 4 is an illustration showing an example of the format of the subcode area of the track format shown in FIG. 2.

Further, as shown in FIG. 4, the subcode area 13 includes 16 blocks sequentially synthesized. Each block of 28 bytes is composed of a two-byte synchronizing signal (sync) area 31, a three-byte address data (ID) area 32, a 19-byte data area 33, and an four-byte parity area 34. The subcode area 13 is thus synthesized as 448 (16×28) bytes in total. Here, each of these 16 blocks is an independent block, separately. Further, as the subcode data, there are data, such as format data of the main data, recorded contents, recorded data and time, etc., all attached to the main data recorded in the data area 17 following the subcode area 13.

Figure 5:
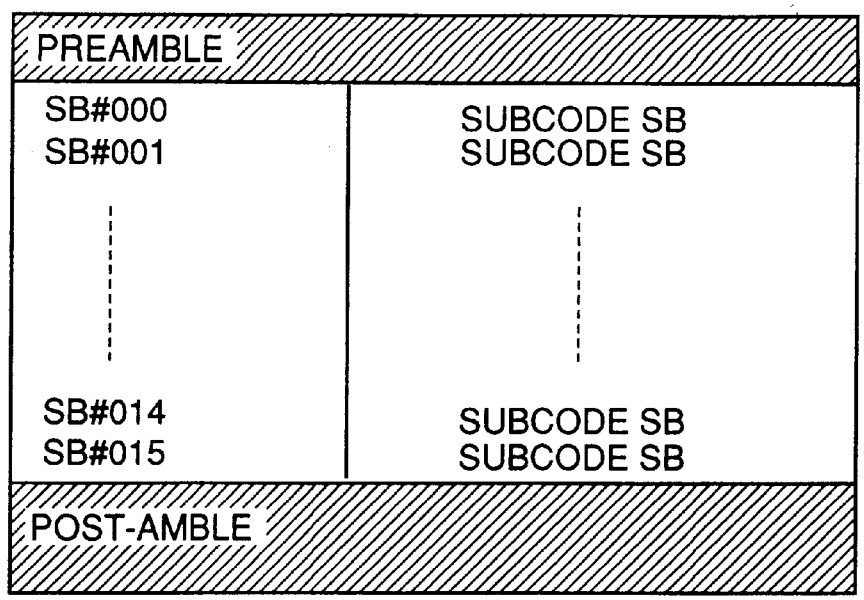
FIG. 5 is an illustration showing an example of the subcode area.
Figure 6:
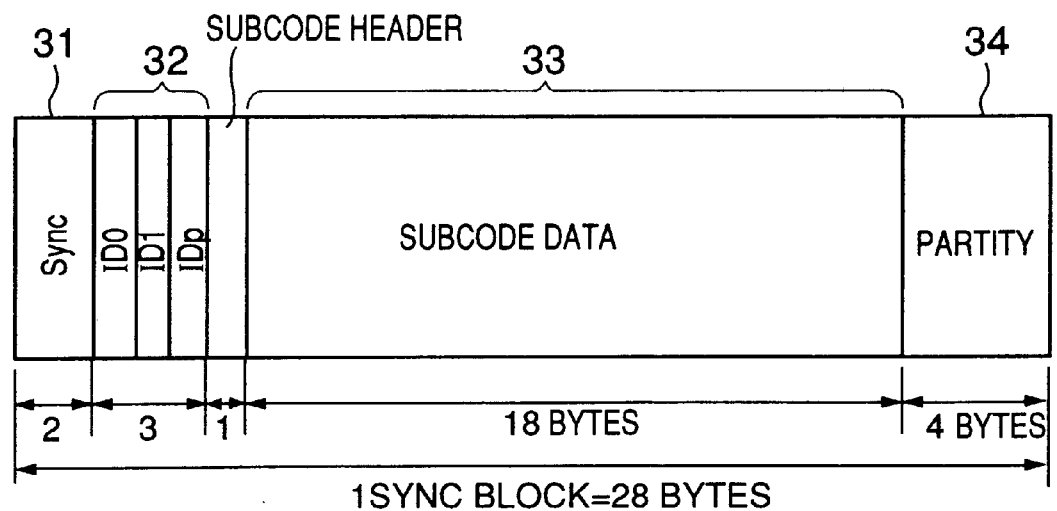
FIG. 6 is an illustration showing a detailed construction of one sync block in the subcode area.

FIG. 5 shows a more detailed format of the subcode area 13, in which 16 sync blocks SB exist in each subcode area 13. Further, the format of each sync block of the subcode area is shown in FIG. 6. This format shown in FIG. 6 is constructed by 28 bytes in the same way as with the case of the 28-byte block shown in FIG. 4. Therefore, in FIG. 6, the same reference numerals shown in FIG. 4 have been retained for similar areas. Further, in practice, the data area 33 shown in FIG. 4 is composed of 18-byte subcode data (e.g., made up of thee packet data each having six bytes) and a one-byte subcode header, as shown in FIG. 6.

Further, as shown in FIG. 6, the address data (ID) area 32 shown in FIG. 4 is composed of one-byte first address data ID0, one-byte second address data ID1, and one-byte ID parity IDP of error correction for these address data.

Here, the respective values of the address data ID0 and ID1 are determined, as shown in FIG. 7, according to the sync block numbers SB# recorded in the subcode area. In more detail, as understood by FIG. 7, a support flag SF indicative of the track number status is provided as two high order bits of the address data ID0 of the sync block of the (4n+1)-th (n: 0, 1, 2, 3) sync block number. Further, [Tag] provided as the four high order bits of the address data ID1 shown in FIG. 6 is composed of a start flag, an index flag, a skip flag, and a maker flag. Here, however, since these flags are not directly related to the gist of the present invention, the description of these flags are omitted herein.

The contents of the above-mentioned two-bit support flag SF will be explained in further detail hereinbelow. When the flag SF is [00], this indicates that the track number is not supported, that is, no track number is recorded. When the flag SF is [01], this indicates that there exists a possibility that the track numbers are overlapped (i.e., the presence of overlap possibility). When the flag SF is [10], this indicates that there exists a possibility that the track numbers are not overlapped but not continuous (i.e., the absence of overlap but the presence of discontinuity possibility). Further, when the flag SF is [11], this indicates that the track numbers are continuous beginning from the start without being overlapped (i.e., the continuous track number without overlap).

Further, as shown in FIG. 7, the upper bytes of the track number are arranged as an absolute address at the six low order bits of ID0 of the sync block of the (4n+1)-th sync block number; the middle bytes of the track number are arranged as ID0 of the sync block of the (4n+2)-th sync block number; and the lower bytes of the track number are arranged as ID0 of the sync block of the (4n+3)-th sync block number. Therefore, it is possible to represent one track number (absolute track number) ATNo on the basis of these 22 bits.

The feature of the data recording method according to the present invention is that: the track numbers of the minimum track pitch are determined as a scale or a minimum resolution; and the determined track numbers of the minimum resolution are used for the track pitch larger than the minimum track pitch. In more detail, two low order bits, i.e., the first and second least significant bits arranged in the address data ID0 of the sync block of (4n+3)-th sync block number shown by I in FIG. 7 are changed according to the first and second least significant bits of the track numbers of the minimum track pitch, as described later.

Here, the two first and second least significant bits of the track numbers will be explained in further detail hereinbelow. The assumption is made that there are five different track pitches of 14.5 $\mu$m, 19 $\mu$m, 23.2 $\mu$m, 29 $\mu$m and 58 $\mu$m. The track pitch is a distance between two central lines of two adjacent inclined tracks (whose format is shown in FIG. 2) formed on the magnetic tape.

Here, when digital data are sequentially recorded by forming tracks at the minimum recordable track pitch of 14.5 $\mu$m, the two first and second least significant bits of the track numbers change usually in the order of [00]→[01]→[10]→[11]→[00] . . . , whenever a single track is formed. In other words, when the tracks are sequentially formed during recording at the track pitch of 14.5 $\mu$m, the 22-bit track number is increased by "1" whenever each track is formed.

In contrast with this, when digital data are sequentially recorded by forming tracks at a pitch larger than 14.5 $\mu$m, the track numbers the same as those of the track pitch of 14.5 $\mu$m are used as the two first and second least significant bits of the track numbers of the pitch larger than 14.5 $\mu$m. And, the track numbers corresponding to the recorded track numbers of the pitch larger than 14.5 $\mu$m are used as the 20 (=22−2) remaining high order bits of the track numbers.

In more detail, the change of three low order bits of the track numbers obtained when the track pitch is 14.5 $\mu$m is shown in FIG. 1(A). Here, in the case of the track pitch 19 $\mu$m, since three tracks are to be recorded in the same area for recording four tracks at the track pitch of 14.5 $\mu$m, the change of the three low order bits of the track number obtained when the track pitch is 19 $\mu$m becomes as shown in FIG. 1(B).

In other words, when the tracks are sequentially recorded at the track pitch of 19 $\mu$m, since the recording start of the second track of the track pitch of 19 $\mu$m is located at a position within the second track of the track pitch of 14.5 μm, the two first and second least significant bits of the track pitch of 19 μm are determined as [01]. Like this, since the recording start of the third track of the track pitch of 19 μm is located at a position within the third track of the track pitch of 14.5 μm, the two first and second least significant bits of the track pitch of 19 μm are determined as [10]. Further, since the recording start of the fourth track of the track pitch of 19 μm is located at the same position as that of the track recording start of the fifth track of the track pitch of 14.5 μm, the two first and second least significant bits of the track pitch of 19 μm are determined as [00]. As a result, in the case of the recording at the track pitch of 19 μm, as shown in FIG. 1(B), the two first and second least significant bits sequentially change in the order of [00]→[01]→[10]→[00] . . . whenever a single track is recorded.

The other track pitches change in the same way as described above. That is, the change of the three low order bits of the track numbers obtained when the track pitch is 23.2 μm is shown in FIG. 1(C); the change of the three low order bits of the track numbers obtained when the track pitch is 29 μm is shown in FIG. 1(D); and the change of the three low order bits of the track numbers obtained when the track pitch is 58 μm is shown in FIG. 1(E), respectively.

Therefore, in the case of the recording at the track pitch of 23.2 μm, the two first and second least significant bits of the track numbers change in the order of [00]→[01]→[11]→[00]→[10] . . . , whenever a single track is recorded. Further, in the case of the recording at the track pitch of 29 μm, the two first and second least significant bits of the track numbers change in the order of [00]→[10]→[00] . . . , whenever a single track is recorded.

On the other hand, when the tracks are sequentially formed at the track pitch of 58 μm, since one track is recorded in the same area in which four tracks of the track pitch of 14.5 μm are recorded, the two first and second least significant bits of all the track numbers will fixed at [00] without changing. That is, in this case, the track numbers change by increasing 20 high order bits of 22-bit track number, whenever a single track is recorded.

Further, when new data different from the preceding recorded data is required to be recorded at another track pitch different from that of the preceding program midway of the magnetic tape, the remaining tape rate is calculated by the known method at the midway-recording start time point or the last bit of the preceding track number obtained after rewinding for a certain period is detected. Further, on the basis of these detected results, new data are recorded in such a way that the track numbers can be continued, including the above-mentioned first and second least significant bits, in correspondence to the tape position.

As described above, in the data recording method according to the present invention, even if the track pitch changes, since the absolute values of the track numbers can be known on the basis of the two first and second least significant bits of the track number, it is possible to easily calculate the remaining tape rate, even if the tape travel speed (i.e., the track pitch) changes.

Further, the data recording method according to the present invention is not limited only the above-mentioned embodiment. For instance, the method can be applied to an apparatus for recording analog signals. In this case, the track numbers and the support flags SF can be recorded on the inclined tracks being multiplexed at specific positions within the vertical blanking period of the recorded video signals. Further, the method according to the present invention can be applied to an apparatus for recording time codes. Further, the track pitches are not limited only to the afore-mentioned five pitches.

As described above, in the data recording method according to the present invention, even when the tracks are recorded at any track pitches, since the absolute positions of the tracks can be found on the tape storage medium, even if the tape travel mode (speed) changes, the remaining tape rate can be calculated easily. In addition, the data start position can be calculated and searched by use of the same program during any track pitch recordings. Further, an automatic head selection of the recorded data can be executed accurately.

What is claimed is:

1. A method of recording data over tracks formed on a tape storage medium at a predetermined track pitch selected from a plurality of track pitches, the method comprising the steps of:

deciding a first value of a first absolute address of n bits assigned to each of first tracks formed with the minimum track pitch among the track pitches, n being an integer of two or more;

deciding a second value of a second absolute address of the n bits assigned to each of second tracks formed with the predetermined track pitch so that a value of an m-th low order bit of the second absolute address is equal to another value of the m-th low order bit of the first absolute address of each first track located on the tape storage medium at a position corresponding to another position of each second track, m being an integer of one or more but smaller than n; and recording the data and the second value of the second absolute addresses over the second tracks formed by the predetermined track pitch.

2. The method according to claim 1, wherein the step for deciding the second value comprises the step of increasing a (n−m)-th high order bit of at least the second absolute address of each second track located on the tape storage medium at a position corresponding to another position of each of third tracks formed with the maximum track pitch among the track pitches.

3. The method according to claim 1, wherein the first and second absolute addresses indicate a track number or a time code.

4. The method according to claim 1 further comprising the step of recording the first and second absolute addresses over the second tracks formed by the predetermined track pitch, wherein the first and second absolute addresses are superimposed on a signal or information signal train including the data.

5. The method according to claim 1 further comprising the step of recording first data on a track with a first pitch following second data already recorded on another track with a second pitch different from the first pitch so that the second value including the value of the m-th low order bit of the second absolute address continues so as to correspond to locations of tracks on the tape storage medium based on the remaining tape rate or the last value of an absolute address of a preceding track after rewinding the tape storage medium for a certain period.

* * * * *